June 10, 1947.  E. C. UHLIG  2,422,148
METHOD OF MAKING BATTERY SEPARATORS
Filed Dec. 7, 1944  2 Sheets-Sheet 1
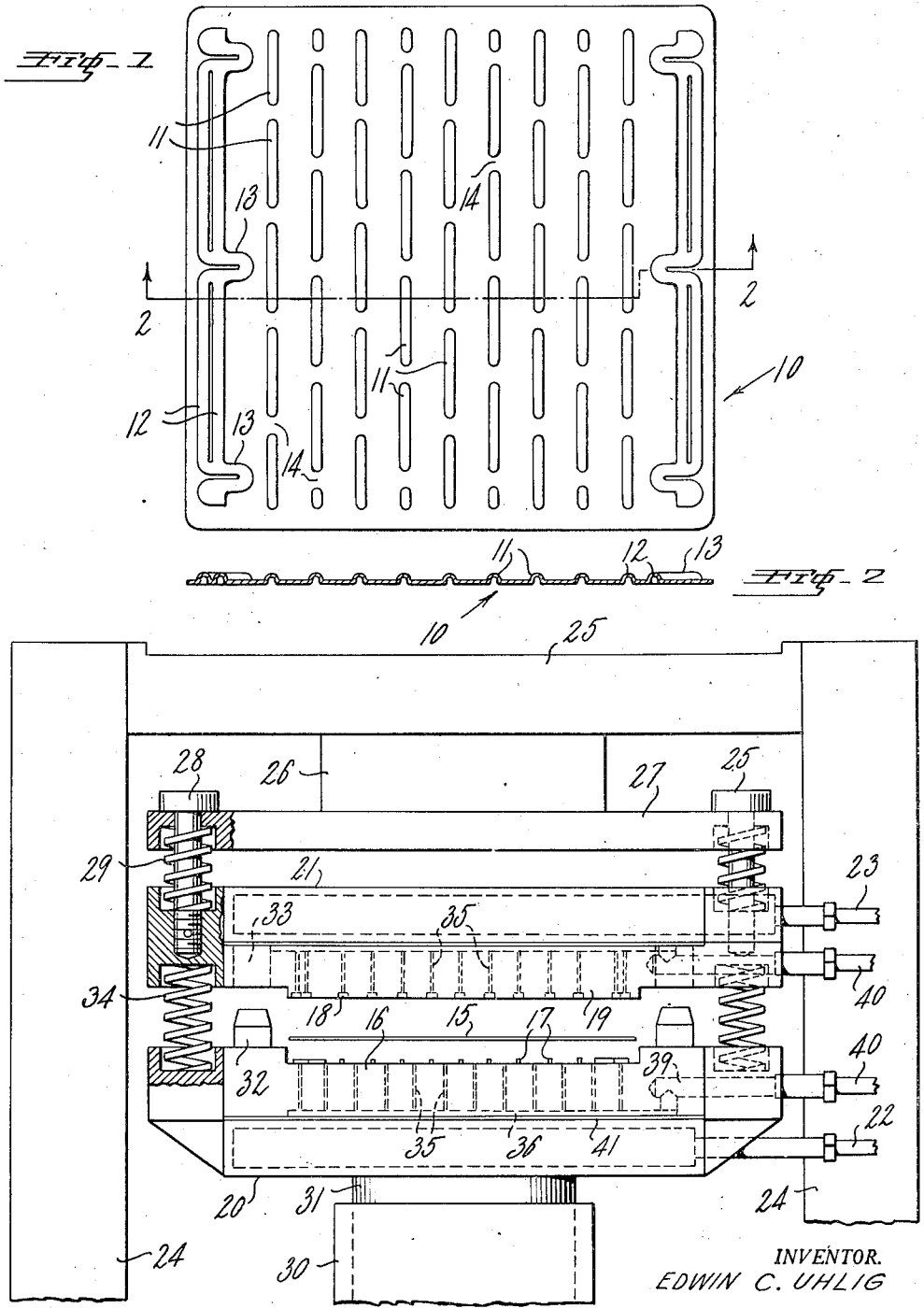
INVENTOR.
EDWIN C. UHLIG
BY Lester J. Budlong
ATTORNEY June 10, 1947.   E. C. UHLIG   2,422,148
METHOD OF MAKING BATTERY SEPARATORS
Filed Dec. 7, 1944   2 Sheets-Sheet 2
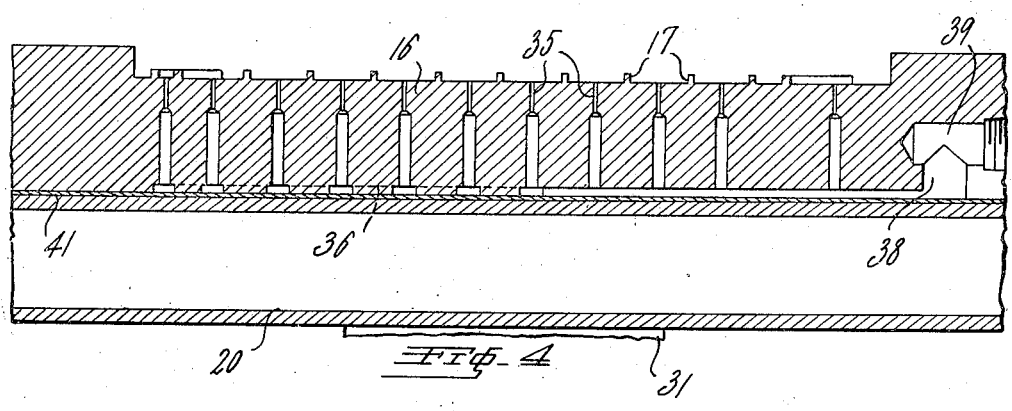
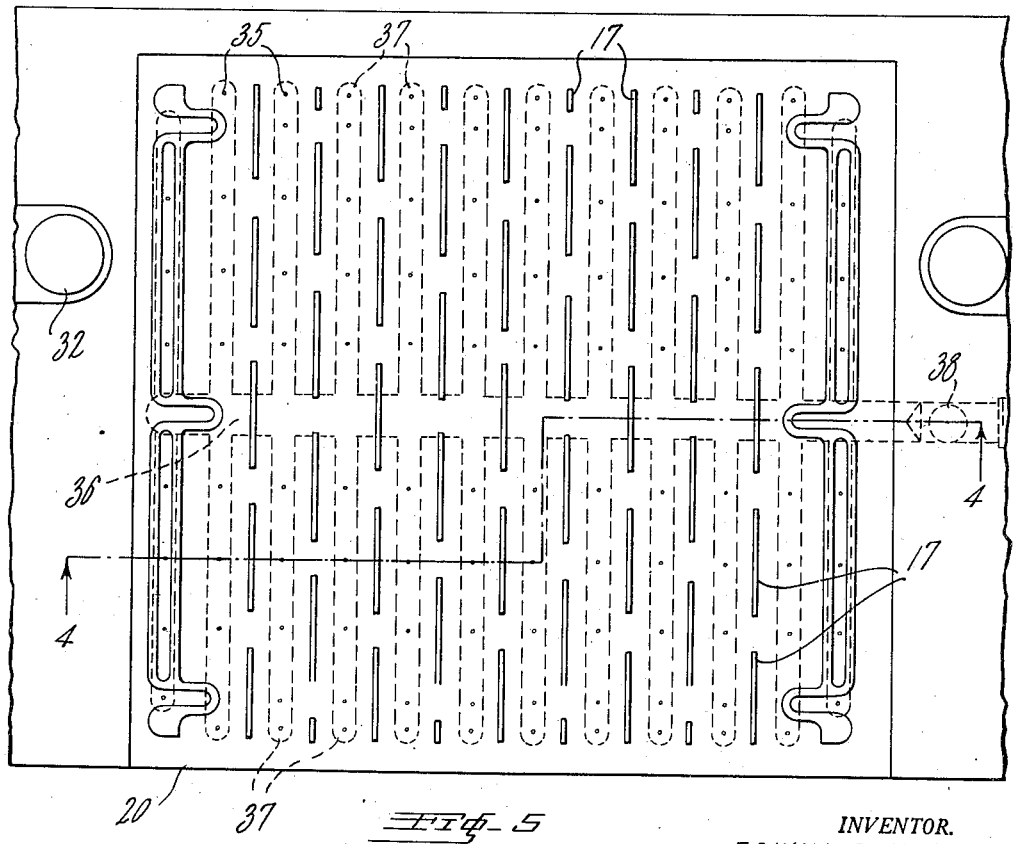
INVENTOR.
EDWIN C. UHLIG
BY
ATTORNEY Patented June 10, 1947

2,422,148

UNITED STATES PATENT OFFICE 2,422,148

METHOD OF MAKING BATTERY SEPARATORS

Edwin C. Uhlig, Greenwood, R. I., assignor to United States Rubber Company, New York, N. Y., a corporation of New Jersey Application December 7, 1944, Serial No. 567,081

7 Claims. (Cl. 18—56)

This invention relates to an improved method of making battery separators formed of microporous vulcanized hard rubber or other microporous plastic composition.

Thin porous separators made of non-conducting material with sufficient mechanical strength for convenient handling are placed between the positive and negative plates in storage battery cells where they serve to prevent metallic conduction between the plates of opposite polarity. These separators should be made as thin and as porous as other conditions will permit so that they will offer a minimum electrical resistance when immersed in storage battery electrolyte, but the pores should be small enough to prevent "treeing" wherein conductive particles that build up on the face of a plate extend through the separator from one plate to the other to form a short circuit.

Many battery separators used heretofore have been formed of wood or microporous vulcanized hard rubber having spaced ribs of greater thickness than the flat web portions of the separator lying between the ribs. Since such ribs were thicker than the web portions of the separator, the increased thickness of the rib offered additional electrical resistance when the separator was immersed in storage battery electrolyte. These separators may be made of microporous vulcanized hard rubber or heat-softenable plastic composition.

In order to make the embossed separators herein contemplated it is necessary to distend or distort those portions of the sheet where the ribs are to be formed. This has to be done carefully, particularly if the sheet to be embossed is a microporous sheet of vulcanized hard rubber, to prevent cracking the sheet in the vicinity of the ribs during the embossing operation.

In order to emboss a sheet of microporous vulcanized hard rubber or plastic composition as herein contemplated, it is necessary to heat the sheet until it is softened but not fused and then subject it to the embossing pressure. After the sheet has been embossed it should be quickly cooled to a point below its softening temperature. This preferably should be done before it is relieved from the embossing pressure, because if the embossing pressure is relieved while the sheet is still in a soft condition it will not retain the sharp contour imparted to it by the embossing operation. The need of lowering the temperature of the embossed sheet before relieving the embossing pressure presented a serious difficulty in the way of rapid production of embossed separators, and the present method provides a solution to this difficulty.

It is possible to produce embossed microporous separators by placing a sheet of heat-softenable microporous material between the cooperating platens of a heated embossing mold and slowly closing the mold to heat and emboss the sheet, and then cool the mold below the softening temperature of the sheet before opening the mold, but if the temperature of the mold has to be raised and lowered for each separator turned out the production of such separators will be slow and costly.

The present invention overcomes this difficulty and provides a simple practical method for quickly reducing the temperature of the embossed sheet below that of the mold while it is in the embossing mold.

This is accomplished by wetting the microporous sheet with water, in the case of vulcanized hard rubber, and then inserting the wet sheet in the heated embossing mold and closing the mold to emboss the sheet, then while the mold is closed the temperature of the embossed sheet is quickly lowered by forcing air under pressure through apertures in the mold and through the sheet to thereby evaporate the water contained in the sheet so that this evaporation will serve to reduce the temperature of the sheet sufficiently to set the same in the embossed condition. The mold may then be opened and the sheet will retain accurately the configuration imparted thereto by the molding operation. It may be desirable however to continue the air blast for a short preiod after the mold is opened to further cool the separator and also to aid in ejecting the embossed separator from the mold. In this manner the necessity of raising and lowering the temperature of the embossing mold each time a separator is made is avoided and the operation of embossing separators may be carried out at high speed.

When hard rubber or other plastic materials herein contemplated are heated, while being subjected to a constant applied load, a temperature is reached at which such material begins to soften and its ability to resist deformation under stress decreases rapidly with further rise in temperature. This softening under such further rise in temperature is usually referred to as the "yield temperature" and will be so referred to herein. In other words, when such materials are heated a temperature is first reached at which the material tends to lose its rigidity and permits slight bending under such load, the temperature at which this occurs is called the "softening temperature" or the "softening point," and it is easily determined by using an A. S. T. M. test. As the temperature increases further the material becomes much softer and its ability to resist deformation under stress decreases rapidly. This temperature above the "softening point" at which the material is sufficiently softened to yield quickly without rupturing is the above mentioned "yielding temperature." Hard rubber has a gradual softening point and yield temperature extending over a wide temperature range, whereas some of the other materials used to form battery separators in accordance with the present method may have a narrow temperature range. This wide range for hard rubber permits the operation of the embossing mold at relatively high temperature to speed up the embossing operation, provided the temperature of the embossed sheet is lowered below the yield temperature before the embossing pressure is relieved.

The various features of the present method will be more fully understood when read in connection with the accompanying drawings illustrating one good practical form of mechanism for embossing separators in accordance with the present invention.

In the drawings:

Fig. 1 is a plan view of a finished embossed battery separator constructed in accordance with the present invention.

Fig. 2 is a section taken on the line 2—2 of Fig. 1.

Fig. 3 is a side elevation with parts in section of an hydraulically operated embossing press adapted to produce the separator shown in Fig. 1.

Fig. 4 on a larger scale is a vertical sectional view through the lower embossing platen of Fig. 3, the section being taken on line 4—4 of Fig. 5; and Fig. 5 is a top plan view of the lower embossing platen.

The method of the present invention may be employed to produce microporous battery separators formed of hard rubber or other heat softenable plastic material. The method will be described in detail as employed to emboss microporous sheets of vulcanized hard rubber and then other heat softenable plastic materials which may be used in practicing the invention will be described.

The ribs formed upon the embossed battery separator herein contemplated serve to increase the stiffness of the separator and to space the same from the positive plate. These ribs may be given various sizes and shapes and in the construction shown the separator 10 is provided with vertical rows of short ribs 11, provided throughout the major portion of the separator. These rows of ribs, it will be noted, terminate short of the upper and lower ends of the separator to provide marginal edge portions adjacent each end of the separator which are free from ribs, as this construction lessens the tendency of the separator to crack at its ends. It will also be noted that the separator 10 is provided near each side edge with the double ribs 12 having the looped ribbed portions 13 extending laterally therefrom. Since the ribs 11 are made non-continuous the flat spaces 14 between the adjacent ends of such ribs will lessen the tendency of the embossed separator to spread laterally under pressure exerted against a face thereof.

The microporous sheet of vulcanized hard rubber of which the separator shown in Fig. 1 of the drawing is formed is preferably made microporous by employing the treatment disclosed in the Baty and Meyer Patent No. 2,329,322. Such a sheet when vulcanized and ready to be embossed should have a thickness somewhere near .027", and should be sufficiently non-brittle to handle well without breaking and to be embossed in a manner now to be described.

Before such a microporous vulcanized hard rubber sheet is introduced into an embossing press, such as shown in Fig. 3 of the drawing it should be soaked in hot water and heated to a temperature of approximately 200° F. It may then be introduced in the embossing mold to the position indicated by 15 in Fig. 3 of the drawing, ready to be dropped down upon the lower embossing platen 16 having the embossing ribs 17, which ribs are adapted to cooperate with the correspondingly disposed grooves 18 formed in the upper platen 19. The lower platen 16 is rigidly secured to a lower heating unit 20 and the upper platen 19 is similarly secured to an upper heating unit 21. These units may be heated electrically or by steam, and are shown as hollow and adapted to receive heating steam supplied by the flexible pipes 22 and 23.

Although, the sheet 15 is wet and hot when it is introduced into the embossing press, having been transferred promptly to this press from a hot water bath, it is probably near the lower limit of the yield temperature and should be heated further before being subjected to the full embossing pressure. Therefore the press used is preferably so constructed that it will close against the sheet 15 under comparatively light pressure, and then this pressure is increased as the temperature of the sheet 15 is elevated by its contact with the heated platens 16 and 19.

This slow complete closing of the embossing press is secured in the construction shown by providing a main frame consisting of the uprights 24 the upper ends of which are rigidly secured to the head plate 25 which carries the central block 26 to which is rigidly secured the plate 27 adapted yieldingly to support the upper heating unit 21 and upper platen 19. To this end bolts 28 are provided extending downwardly through holes in the plate 27 and having threaded engagement with side portions of the heating unit 21, whereby the heating unit is suspended from the plate 27 in spaced relation thereto but may be forced upwardly into abutting relation with the lower face of the plate 27 upon compression of the coiled springs 29.

The lower platen 16 and heating unit 20 are adapted to be hydraulically raised and lowered and to this end there is provided the hydraulic cylinder 30, the lower portion of which (not shown) is rigidly secured to the lower ends of the uprights 24. Within the hydraulic cylinder 30 is slidably mounted the usual ram or piston 31, the upper end of which is secured to the lower heating unit 20. The lower platen 16 secured to this unit has the upwardly projecting aligning pins 32 adapted to enter correspondingly shaped holes 33 in the upper platen to insure accurate alignment of the platens when the press is closed. Between the upper and lower platens are confined the coiled springs 34.

The relative strength of the coiled springs 34 and 29 should be such that when the ram 31 is elevated by the introduction of a liquid under pressure within the cylinder 30 the lower platen 16 will move upwardly until the sheet 15 resting upon the ribs 17 will be moved upwardly into contact with the lower face of the platen 19, whereupon the upper platen will rise and compress the springs 29. During this upward travel of the upper platen 19 the temperature of the sheet 15 will be increased by its contact with the hot platens and the embossing pressure upon this sheet will be gradually increased. When the heating unit 21 abuts against the plate 27 the sheet 15 will be subjected to the full embossing pressure of the hydraulic ram. The press may then be opened as soon as the temperature of the embossed separator is reduced below the softening point, so that the separator will not flow when the press is opened and lose the sharpness of the design imparted thereto by the embossing operation.

In order to speed up production it is desirable to maintain the platens 16 and 19 at a temperature well above the lower limit of the yield temperature so that the press will quickly heat the sheet 15 sufficiently to cause the same to take the full pressure of the press without cracking, but as just pointed out the embossing pressure on the sheet 15 should not be relieved as long as the temperature of this sheet is well above the lower limit of the yield temperature.

Therefore in order to produce embossed separators rapidly under the condition just mentioned, the primary feature of the present invention resides in the step for quickly cooling the embossed sheet 15 below the temperature of the embossing mold while such sheet is subjected to the embossing pressure. This is accomplished by providing a large number of minute apertures such as drill holes 35 in both platens so that air under strong pressure may be forced upwardly through the lower platen 16 and downwardly through the upper platen 19 and through the embossed sheet 15, so as to vaporize rapidly the water present in this sheet and utilize the cooling effect of such rapid evaporation to cool the embossed sheet 15 to a point below its yield temperature, whereupon the press may be opened and the finished embossed sheet removed therefrom.

The construction whereby compressed air is supplied to the various apertures 35 of the lower platen 16 is well shown in Figs. 4 and 5 of the drawing, wherein it will be seen that the lower face or back of the platen 16 has formed transversely thereof near the mid-section a relatively wide channel 36 and has leading therefrom at right angles thereto the numerous smaller channels 37. The small apertures 35 are supplied with compressed air from the channels 37. Air under pressure is supplied to the main channel 36 by the port 38 leading from the drill hole 39 having secured thereto a flexible air supply pipe 40. A gasket 41 lying between the adjacent faces of the platen 16 and heating unit 20 prevents air supplied under pressure to the channels 36 and 37 from escaping in any direction except through the small apertures 35. A construction such as just described is also associated with the upper platen 19 and serves to supply compressed air to its apertures 35.

The operation involved in carrying out the method of the present invention may be briefly described as follows: A microporous sheet of vulcanized hard rubber is removed from a tank of hot water maintained at about 200° F. and placed in the position indicated by 15 in Fig. 3 of the drawing, whereupon the hydraulic cylinder 30 is supplied with operating liquid under pressure so as to force upwardly the ram 31 and close the mold against the sheet 15 under enough pressure to only slightly emboss this sheet while it is being further heated by its contact with the platens 16 and 19. When the upper platen is forced upwardly into abutting relation with the plate 27 the sheet 15 will be subjected to the full embossing pressure, whereupon air under pressure of about 80 pounds per square inch may be forced through the embossed sheet 15 by manually operating a valve, not shown, but adapted to supply air to the flexible pipes 40, 40. This strong flow of air through all portions of the wet sheet 15 will quickly evaporate the water which it carries and by such evaporation cool the sheet 15, whereupon the press may be promptly opened and the finished embossed sheet 15 removed therefrom.

It is highly important that the sheet 15 be wet since this causes a quick transfer of heat from the platens to the sheet 15 during the early stages of the embossing operation, and also effects the desired cooling just described by evaporating when a blast of air is forced through the sheet. Air alone in the absence of moisture in the sheet 15 will not cool the sheet appreciably since this air will be heated by its passage through the small apertures 35 in the hot platens. The various steps just described can be carried out in five seconds or less from the time the sheet 15 is first placed in the mold until the finished embossed separator is removed therefrom.

As above stated the embossed separator may be formed of microporous vulcanized hard rubber or other heat softenable plastics. The following is a list of heat softenable organic plastic materials that may be used in making battery separators in accordance with the present method.

1. Vulcanized hard rubber (natural rubber)
2. Vulcanized hard rubber (Buna S, Buna N)
3. *Plasticized or non-plasticized—plastics*
    (a) Polystyrenes (Polyfibre, Lustron, Styron, #18 Styramic, Styramic HT, Cerex)
    (b) Polyacrylates (Lucite, polymethyl-methacrylate)
    (c) Polyvinylidenes (Geon, Saran)
    (d) Polyvinyls (Polyvinyl Chloride, Vinylites)
    (e) Polyamides (nylon)

The plasticized or non-plasticized—plastics are preferably fiberized and collected in a batt or mat and then sintered at such pressure and temperature as to form a microporous sheet having a porosity greater than 40% and the other physical properties above described as necessary for the battery separator herein contemplated. The porosity of such a sheet can be controlled by the filament diameter or angular disposition of the filaments in the sheet and pressure and heat used to unite them. A microporous sheet of these plastics may also be formed by sintering small particles thereof under proper conditions.

If the plastic material used has a higher yield temperature than 212° F. then it may be desirable to use a wetting liquid having a higher boiling point than water, in this case glycerol or butyl alcohol (1-butanol) may be used. Such liquid should boil at a temperature not much above the yield temperature of the plastic separator sheet.

As a result of the present invention the embossing platens 16 and 19 may be maintained at a temperature near the upper limits of the yield temperature of the separator material, so as to soften the sheet 15 quickly and thereby speed up the embossing operation, and by employing the cooling operation secured by forcing air through the wet sheet 15, its temperature can be quickly lowered sufficiently to permit the opening of the press without losing the accuracy of the embossed contour imparted to the sheet. This permits the embossing operation to be carried out at high speed.

Having thus described my invention, what I claim and desire to protect by Letters Patent is:

1. The method of producing an embossed microporous battery separator, which comprises the steps of forming a microporous sheet of vulcanized hard rubber; wetting the sheet with water and heating it while wet, then subjecting this hot wet sheet to a sufficiently high temperature and embossing pressure to render the sheet soft and emboss it quickly before evaporation of substantially all the water present occurs, and while under such hot embossing pressure reducing the temperature of the embossed sheet to render it stiffer and set the embossed design by forcing air therethrough to evaporate the contained water with cooling effect, then relieving the embossing pressure while the temperature of the sheet is so reduced and opening the mold so that the entire time the sheet remains in the mold does not exceed five seconds.

2. The method of producing an embossed microporous battery separator, which comprises the steps of forming a micorporous sheet of vulcanized hard rubber; heating said sheet in the presence of water, then subjecting this hot wet sheet to embossing pressure between dies heated to a sufficiently high temperature to render the sheet soft enough to be embossed without fracture of the surface of the sheet and before evaporation of substantially all the water present in the sheet occurs, and while under such hot embossing pressure reducing the temperature of the embossed sheet to render it stiffer and set the embossed design by forcing air therethrough to evaporate the contained water with cooling effect, and then relieving the embossing pressure of the dies while the temperature of the sheet is so reduced.

3. The method of producing an embossed microporous battery separator, which comprises the steps of forming a microporous sheet of vulcanized hard rubber; wetting the sheet and placing said sheet while in a water-soaked condition in a mold that is sufficiently hot to soften the sheet to the point where it can be embossed before most of its water is driven off, embossing the sheet in said mold, and while under the hot embossing pressure reducing the temperature of the embossed sheet to set the embossed design by forcing air therethrough to evaporate the contained water with cooling effect, and relieving the embossing pressure while the temperature of the sheet is so reduced.

4. The method of producing an embossed microporous battery separator, which comprises the steps of forming a microporous sheet of heat-softenable organic plastic composition, wetting said sheet with a liquid that is a non-solvent for and is inert to the sheet and which boils at a temperature equal to or slightly above the embossing temperature, subjecting the sheet to a hot embossing pressure so as to emboss the sheet before substantially all of its contained liquid is driven off, while under this hot embossing pressure reducing the temperature of the embossed sheet to set the embossed design by forcing air therethrough to volatilize the liquid with cooling effect, and relieving the embossing pressure while the temperature of the sheet is so reduced.

5. The method of producing an embossed microporous battery separator, which comprises the steps of forming a microporous sheet of heat-softenable organic plastic composition, wetting said sheet with a liquid that is a non-solvent for and is inert to the sheet and which boils at a temperature equal to or slightly above the embossing temperature, subjecting the sheet to a hot embossing pressure in a press to emboss the sheet before substantially all of its contained liquid is driven off, while under this hot embossing pressure reducing the temperature of the embossed sheet to set the embossed design by forcing air through the press and sheet to volatilize the liquid with cooling effect upon the sheet, and relieving the embossing pressure while the temperature of the sheet is so reduced.

6. The method of producing an embossed microporous battery separator, which comprises the steps of forming a microporous sheet of vulcanized hard rubber; wetting the sheet with water and heating it while wet, then subjecting this hot wet sheet to a sufficiently high temperature and embossing pressure to render it soft and emboss it before evaporation of substantially all the water present occurs, and then quickly reducing the temperature of the sheet by forcing air through the sheet both before and after it is relieved from the embossing pressure so that the resulting evaporation of the water will lower the temperature of the sheet to set its embossed design.

7. The method of producing an embossed microporous battery separator, which comprises the steps of forming a microporous sheet of vulcanized hard rubber, wetting said sheet with hot water, placing the wet hot sheet in an embossing press that is heated sufficiently to soften the rubber quickly and closing the press to soften and emboss the sheet before complete evaporation of the water present occurs, and while the press is closed quickly reducing the temperature of the sheet by forcing air through and over the sheet, so that the resulting evaporation of the water in the sheet will lower its temperature to set the sheet, and then opening the press to remove the sheet so that the entire time the sheet remains in the press does not exceed five seconds.

EDWIN C. UHLIG.

REFERENCES CITED

The following references are of record in the file of this patent:

UNITED STATES PATENTS

| Number | Name | Date |
| --- | --- | --- |
| 2,321,756 | Kyle | June 15, 1934 |
| 436,314 | Osborne | Sept. 9, 1890 |
| 440,923 | Osborne | Nov. 18, 1890 |